United States Patent
Ginsburg et al.

(10) Patent No.: US 8,994,585 B2
(45) Date of Patent: Mar. 31, 2015

(54) FINE GRAINED DUTY CYCLING AND TIMING CONTROL FOR PULSED RADAR

(71) Applicant: Texas Instruments Incorporated, Dallas, TX (US)

(72) Inventors: Brian P. Ginsburg, Allen, TX (US); Srinath M. Ramaswamy, Murphy, TX (US); Vijay B. Rentala, Plano, TX (US); Eunyoung Seok, Plano, TX (US); Baher S. Haroun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 333 days.

(21) Appl. No.: 13/658,611

(22) Filed: Oct. 23, 2012

(65) Prior Publication Data
US 2014/0111366 A1   Apr. 24, 2014

(51) Int. Cl.
  *G01S 13/00* (2006.01)
  *G01S 7/282* (2006.01)
  *G01S 13/93* (2006.01)

(52) U.S. Cl.
  CPC ............... *G01S 7/282* (2013.01); *G01S 13/931* (2013.01)
  USPC ................. 342/175; 342/21; 342/82; 342/88; 342/89; 342/159

(58) Field of Classification Search
  CPC .......... H04B 1/02; H04B 1/0475; H04B 1/10; H04B 1/403; H04B 1/44; H04B 1/525; H04B 3/32; G01S 7/00; G01S 7/282; G01S 7/285
  USPC ............. 342/21, 82, 88, 89, 159, 175
  See application file for complete search history.

(56) References Cited

U.S. PATENT DOCUMENTS

| | | | | |
|---|---|---|---|---|
| 3,713,153 A * | 1/1973 | van Popta | ....................... | 342/19 |
| 3,778,827 A * | 12/1973 | Strenglein | ....................... | 342/80 |
| 4,001,824 A * | 1/1977 | Bail et al. | ........................ | 342/47 |
| 4,142,189 A * | 2/1979 | Gleason | ........................ | 342/109 |
| 4,562,438 A * | 12/1985 | Rouse et al. | .................. | 342/201 |
| 4,868,917 A * | 9/1989 | Woolcock | .................. | 342/26 B |
| 4,996,474 A * | 2/1991 | Tambe et al. | ............... | 324/76.48 |
| 6,587,072 B1 * | 7/2003 | Gresham et al. | ................. | 342/70 |
| 6,614,390 B2 * | 9/2003 | Steinbuch | ........................ | 342/70 |
| 6,720,908 B1 * | 4/2004 | Puglia | ............................. | 342/70 |
| 8,842,766 B2 * | 9/2014 | Prathapan et al. | ............ | 375/285 |
| 2003/0193430 A1 * | 10/2003 | Gresham et al. | ................. | 342/70 |
| 2005/0258999 A1 * | 11/2005 | Jenkins et al. | .................. | 342/194 |
| 2006/0250293 A1 * | 11/2006 | Jenkins et al. | .................. | 342/21 |
| 2008/0180313 A1 * | 7/2008 | Ikeda et al. | ................... | 342/175 |
| 2012/0062286 A1 * | 3/2012 | Ginsburg et al. | ............. | 327/148 |

* cited by examiner

*Primary Examiner* — Peter Bythrow
(74) *Attorney, Agent, or Firm* — Alan A. R. Cooper; Frank D. Cimino

(57) ABSTRACT

A method is provided. A first edge on a first gating signal is generated, and a local oscillator and a shared clocking circuit with the first edge on the first gating signal. A second edge on a second gating signal is generated following the first edge on the first gating signal, and a receiver circuit is activated with the second edge on the second gating signal, where the receiver circuit includes a mixer. A transmit pulse following the first edge on the first gating signal is generated with the transmit pulse having a third edge. A switch that short circuits outputs of the mixer is then released following the later of the third edge of the transmit pulse and a delay.

19 Claims, 3 Drawing Sheets

FINE GRAINED DUTY CYCLING AND TIMING CONTROL FOR PULSED RADAR

TECHNICAL FIELD

The invention relates generally to pulsed radar and, more particularly, to a phased array pulsed radar operating in the terahertz frequency range.

BACKGROUND

Radar (generally) and pulsed radar (in particular) have been known and used for many years. There have been rather limited applications for radar because of power and size constraints even though there has been a desire to more widely use the technology. With the advent of more advanced process technologies (i.e., CMOS), higher frequency devices (i.e., terahertz radiation device) are within reach, and, with these higher frequency devices, radar (and, namely, terahertz radar) has become possible for applications (such as automotive) that can require high compactness and lower power. An example of a terahertz phased array radar system can be seen in U.S. Patent Pre-Grant Publ. No. 2012/0062286 (which is incorporated by reference herein). However, none of the existing systems address potential overloading of portions of a receiver during an outgoing pulse when blocks within a transceiver are shared. Therefore, there is a need for a method and/or system for addressing receiver overload.

SUMMARY

In accordance with the present invention, an apparatus is provided. The apparatus comprises a first gating circuit; a second gating circuit; a baseband that is coupled to the first gating circuit; a local oscillator that is coupled to the second gating circuit; a transceiver having: a radiator; a receiver circuit that is coupled between the radiator and the baseband circuit; a transmitter circuit that is coupled to the radiator; and a shared clocking circuit that is coupled to the local oscillator, the receiver circuit, and the transmitter circuit; and a controller that is coupled to the first gating circuit, the second gating circuit, the receiver circuit, and the shared clocking circuit, wherein the controller is configured to supply a first gating signal to the first gating circuit, the receiver circuit, and the shared clocking circuit, and wherein the controller is configured to supply a second gating signal to the second gating circuit and shared clocking circuit, and wherein the controller is configured to control the shared clocking circuit such that the shared clocking circuit provides a first local oscillator signal to the receiver circuit when the first gating signal indicates activation, and wherein the controller is configured to control the shared clocking circuit such that the shared clocking circuit provides a second local oscillator signal to the transmitter circuit when the second gating signal indicates activation.

In accordance with the present invention, the local oscillator further comprises a first local oscillator, and wherein the shared clocking circuit further comprises: a shifting circuit that is coupled to the first local oscillator and the controller; a third gating circuit that is coupled to the shifting circuit and the controller, wherein the third gating circuit is configured to receive the second gating signal; a second local oscillator that is coupled to the shifting circuit and the transmitter circuit; a fourth gating circuit that is coupled to the second local oscillator and the controller, wherein the fourth gating circuit is configured to receive the second gating signal; a buffer that is coupled to the second local oscillator and the receiver circuit; and a fifth gating circuit that is coupled to the buffer and the controller, wherein the fifth gating circuit is configured to receive the first gating signal.

In accordance with the present invention, the receiver circuit further comprises: a low noise amplifier (LNA) that is coupled to the radiator; a sixth gating circuit that is coupled to the controller and the LNA, wherein the sixth gating circuit is configured to receive the first gating signal; a mixer that is coupled to the LNA, the buffer, and the baseband circuit; and a seventh gating circuit that is coupled to the controller and the mixer, wherein the seventh gating circuit is configured to receive the first gating signal.

In accordance with the present invention, the mixer has first and second output terminals, and wherein the receiver circuit further comprises: a switch that is coupled between the first and second output terminals of the mixer; and a switch controller that is coupled to the controller and the switch, wherein the switch controller is configured to receive the first gating signal.

In accordance with the present invention, the shifting circuit further comprises: a phase shifter that is coupled to the first local oscillator and the third gating circuit; a multiplexer that is coupled to the phase shifter; an edge selection circuit that is configured to receive a transmit pulse; a flip-flop that is coupled to the edge select circuit and the controller, wherein the flip-flop is configured to receive the second gating signal; a transmit select circuit that is coupled to the flip-flop and the multiplexer, wherein the transmit select circuit is configured to control the multiplexer.

In accordance with the present invention, each of the first, second, third, fourth, fifth sixth, and seventh gating circuits further comprise: a first logic gate that is coupled to the controller; and a second logic gate that is coupled to the first logic gate and the controller.

In accordance with the present invention, the first logic gate is an OR gate and the second logic gate is an AND gate.

In accordance with the present invention, an apparatus is provided. The apparatus comprises a first gating circuit; a second gating circuit; a baseband that is coupled to the first gating circuit; a local oscillator that is coupled to the second gating circuit; a plurality of transceivers that are arranged into a phased array, wherein each transceiver includes: a radiator; a receiver circuit that is coupled between radiator and the baseband circuit; a transmitter circuit that is coupled to the radiator; and a shared clocking circuit that is coupled to the local oscillator, the receiver circuit, and the transmitter circuit; and a controller that is coupled to the first gating circuit, the second gating circuit, the receiver circuit, and the shared clocking circuit, wherein the controller is configured to supply a first gating signal to the first gating circuit, the receiver circuit, and the shared clocking circuit, and wherein the controller is configured to supply a second gating signal to the second gating circuit and shared clocking circuit, and wherein the controller is configured to control the shared clocking circuit such that the shared clocking circuit provides a first local oscillator signal to the receiver circuit when the first gating signal indicates activation, and wherein the controller is configured to control the shared clocking circuit such that the shared clocking circuit provides a second local oscillator signal to the transmitter circuit when the second gating signal indicates activation.

In accordance with the present invention, the transmitter circuit further comprises a power amplifier (PA).

In accordance with the present invention, the multiplexer further comprises a first multiplexer, and wherein the switch controller further comprises: a delay circuit that is coupled to the controller and that is configured to receive the first gating signal; a second multiplexer that is coupled to the delay circuit and the flip-flop; a third multiplexer that is coupled to the second multiplexer; and an inverter that is coupled to the third multiplexer.

In accordance with the present invention, a method is provided. The method comprises generating a first edge on a first gating signal; activating a local oscillator and a shared clocking circuit with the first edge on the first gating signal; generating a second edge on a second gating signal following the first edge on the first gating signal; activating a receiver circuit with the second edge on the second gating signal, wherein the receiver circuit includes a mixer; generating a transmit pulse following the first edge on the first gating signal, wherein the transmit pulse has a third edge; releasing a switch that short circuits outputs of the mixer following the later of the third edge of the transmit pulse and a delay.

In accordance with the present invention, the first and second edges are rising edges and the third edge is a falling edge.

In accordance with the present invention, the step of generating the transmit pulse occurs prior to the step of generating the second edge.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
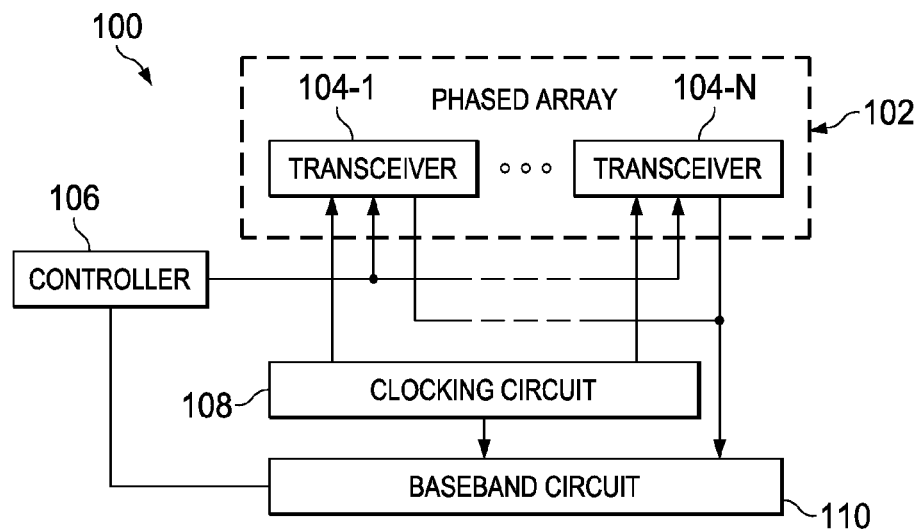
FIG. 1 is a diagram of an example of a phased array system in accordance with the present invention.
Figure 4:
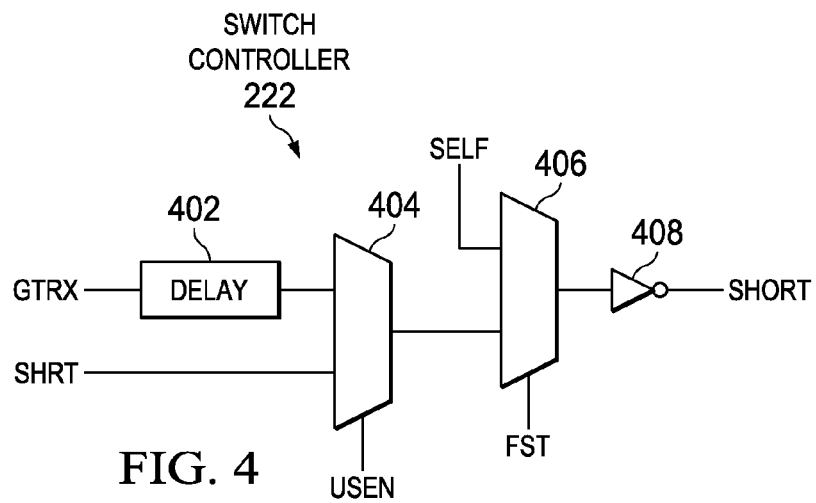
FIG. 4 is a diagram of an example of the switch controller of FIG. 1.

Refer now to the drawings wherein depicted elements are, for the sake of clarity, not necessarily shown to scale and wherein like or similar elements are designated by the same reference numeral through the several views.

Turning to FIG. 1, an example of a phased array system 100 can be seen. In system 100, there are transceivers 104-1 to 104-N that are arranged into a phased array 102. The controller 106 is able to provide phase controls as well as other control information to the transceivers 104-1 to 104-N so as to, for example, direct a radiation beam toward a target so as to function as a short range radar. Typically, the frequency range for the system 100 is the terahertz frequency range (which is generally between about 0.1 THz and about 10 THz). The clocking circuitry 108 can also provide clock signals to both the baseband circuit 110 and to the transceivers 104-1 to 104-N. Typically, this system 100 can be integrated into one or more packaged integrated circuits or ICs.

Of interest here, however, is the timing control of the system 100, which can be seen in detail in FIGS. 2-5. As shown, the controller 106 can individually control each of transceivers 104-1 to 104-N (an example of one of which can be seen in FIG. 2 and is labeled 104), the baseband circuit 110, and the clocking circuit 108. In this example, the transceiver 104 includes a shared clocking circuit 205 which is shared among the receiver circuit (e.g., low noise amplifier or LNA 206 and mixer 204) and the transmitter circuit (e.g., power amplifier or PA 210). The receiver circuit and transmitter circuit can communicate with a radiator 208 (which can, for example, be an antenna that is included on-chip or within an IC package). Because there is a shared clocking circuit 205, the receiver circuit (namely, the baseband circuit 202) can become overloaded during an outgoing pulse through the transmitter circuit, so gating circuitry is employed in this example.

Periodically, the controller 106 will generate a pattern beginning with an edge (e.g., rising edge) of signal GTLO. The controller 106 generally includes a finite state machine or FSM that can generate local oscillator gating signal GTLO and several other control signals that are used throughout the system 100 (such as a receive gating signal GTRX, gate disable local oscillator signal GATELO, and local oscillator enable signal ENLO). This gating signal GTLO is applied to gating circuits 220-1, 220-3, and 220-7. Looking to gating circuit 220-7, for example, this signal GTLO is applied to OR gate 224-7, in this example, along with disable signal GATELO, and the output of OR gate 224-7 is applied to AND gate 226-7 along with enable signal ENLO so as to generate an activation signal. Each of gating circuits 220-1 and 220-3 can have the same configuration as gating circuit 220-7 and can function in a similar manner. The controller 106 can also generate gate disable and gate enable signals for each block (which are used by gating circuits 202-1 to 202-6), but these signals as well as the circuit details of gating circuits 202-1 to 202-6 have been omitted for the sake of simplicity of illustration. The signal GTLO can also clear the flip-flop 308 (which can for example be a D-type flip-flop with its data terminal D coupled to supply rail VDD).

Following the edge (e.g., rising edge) of signal GTLO and activation with gating circuits 220-1, 220-3, and 220-7, an edge (e.g., rising edge) of transmission edge signal TXE or signal GTRX can be generated. The FSM within controller 106 can be designed such that an edge (e.g., a rising edge in this example) occurs before signals TXE and GTRX, and the controller 106 can also generate a transmit pulse PULSE in response to an edge of the signal TXE (e.g., a rising edge in this example). The pulse signal PULSE can be provided to the edge selection circuit (e.g., inverter 302 and multiplexer 304), which is controlled by edge select signal EDSEL, and the output of the edge selection circuit can be used as a clock signal for flip-flop 308 (which was cleared by signal GTLO). The output from the flip-flop 308 can then generate a short circuit signal SHRT (e.g., through buffer 306) or be used by the transmit select circuit (e.g., multiplexers 310 and 314 and delay circuit 312). The transmit select circuit (which is generally controlled by signals SELTRX, FTRX, and DEL) can select a receive phase shift delay for phase shifter 316 or a transmit phase shift delay for phase shifter 316 (which, as shown, are input into multiplexer 318). Because the phase shifter 316 is coupled between local oscillators 218 and 214, this allows for independent beam steering between transmit and receive, and, because a delay is introduced into the system 100, the beam cannot be instantaneously changed (which could prove to be problematic). Typically, the pulse signal PULSE (e.g., rising and falling edges) can propagate through shifting circuit 216 so as to allow a pulse to be transmitted to a target.

Figure 5:
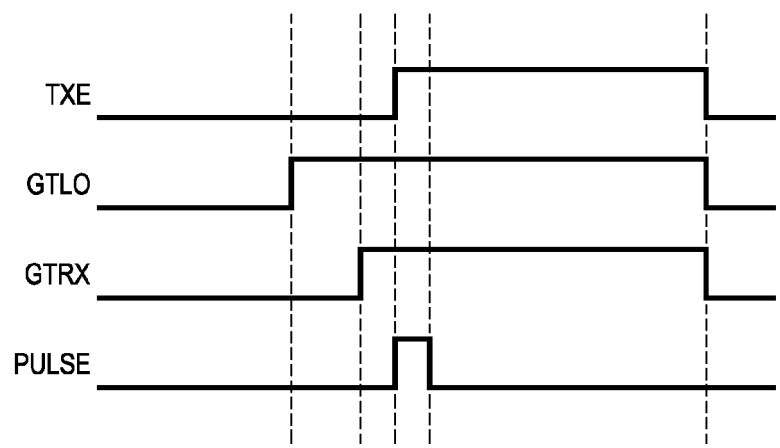
FIG. 5 is an example timing diagram for the system of FIG. 1.
Figure 2:
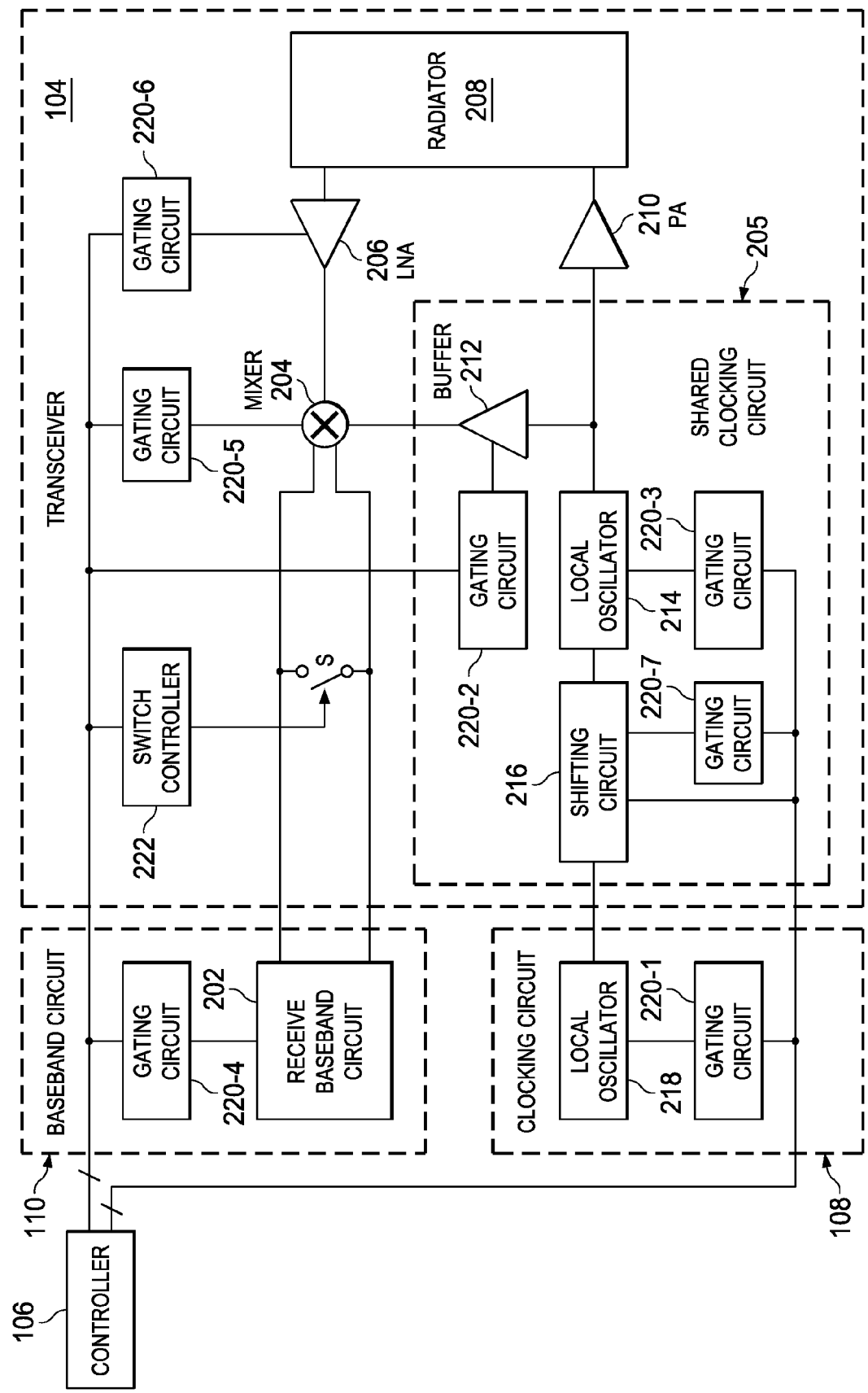
FIG. 2 is a diagram of an example of a transceiver of FIG. 1.
Figure 3:
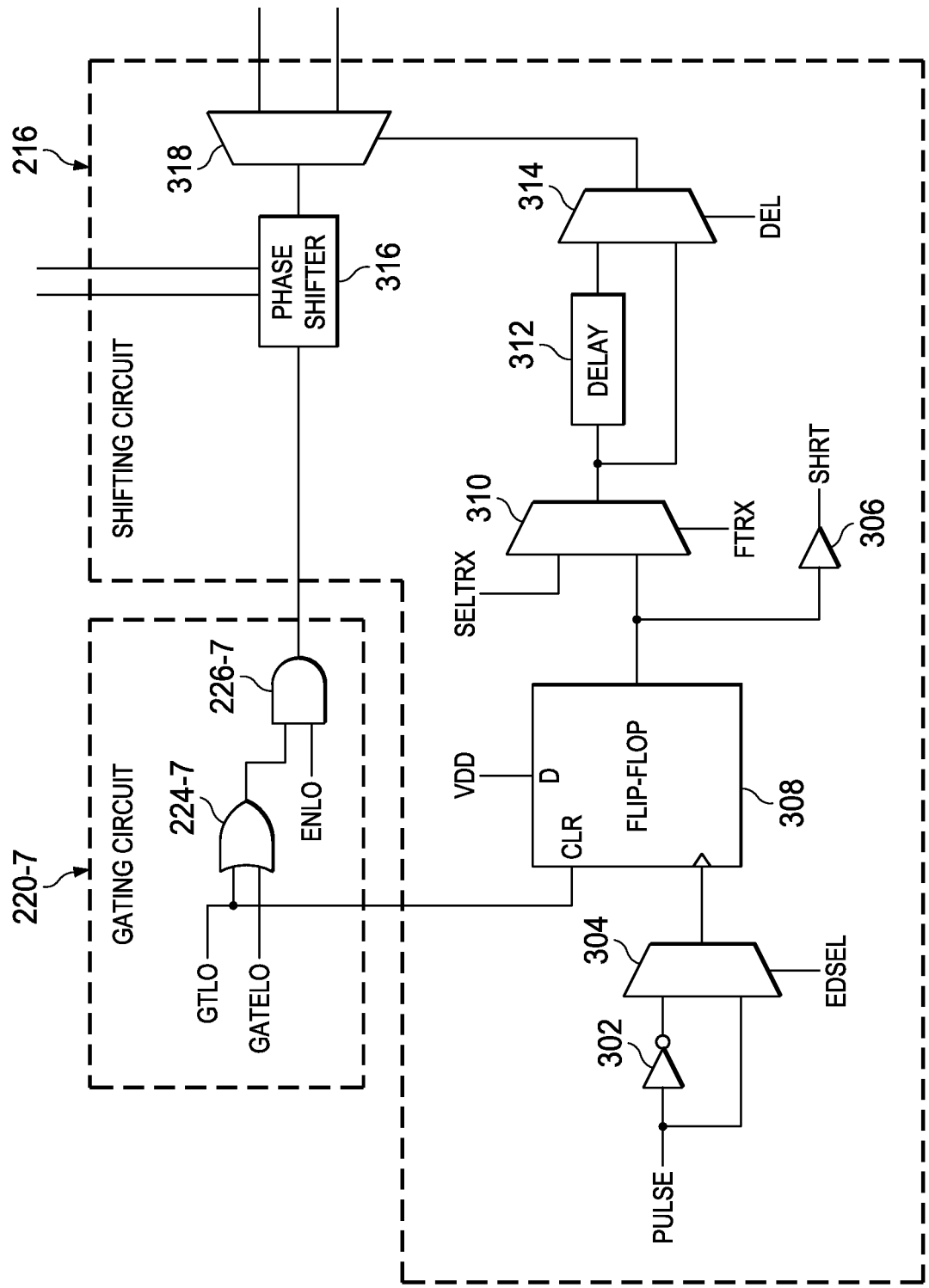
FIG. 3 is a diagram of an example of the shifting circuit of FIG. 1.

Because system 100 is a radar system, it is advantageous to engage the receive path following a transmit pulse (e.g., rising and falling edge of signal as shown in FIG. 5). In order to appropriately clock the system 100, gating circuits 220-2 and 220-4 to 220-6 can activate the receive baseband circuit 202, mixer 204, and LNA 206 on an edge (e.g., rising edge) of the signal GTRX (which follows an edge of the signal GTLO).

Typically, the receiver circuit (e.g., LNA 206 and mixer 204) are active during the transmission of a pulse to allow for rapid detection of a returning pulse. But, to isolate the receive baseband circuit 202, switch S is closed during this transmission period. To accomplish this, the switch controller 222 by way of, and for example, delay circuit 402, multiplexer 404 (which can be controlled by signal USEN), and inverter 408 holds the switch S closed during the "high transient period." Specifically and for example, switch S can be released after the later of a delay to allow a transient to die out (e.g., about 500 ps) or after a falling edge (for example) of the signal PULSE (which can generally constitute the "high transient period"). Effectively, this allows circuit 202 to be isolated during pulse transmission and when the receiver circuit is activate (which are typically the periods with the largest transients). Multiplexer 406 (with the use of signals SELF and FST) can also be used to force switch to remain open or closed.

As a result of using this arrangement, several advantages can be realized. By using pulse synchronized gating within system 100, it can provide significant power savings. This is generally accomplished without alignment blocks on the order of the order of the pulse time constant; instead, block power gatings are synchronized on the time order of startup transients, which can, for example, be an order of magnitude slower than the pulse width. Moreover, there is no requirement for a central transmit/receive switchover with precise timing; those blocks that are transitions can be done so in a distributed manner.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first gating circuit;
   a second gating circuit;
   a baseband that is coupled to the first gating circuit;
   a local oscillator that is coupled to the second gating circuit;
   a transceiver having:
     a radiator;
     a receiver circuit that is coupled between the radiator and the baseband circuit;
     a transmitter circuit that is coupled to the radiator; and
     a shared clocking circuit that is coupled to the local oscillator, the receiver circuit, and the transmitter circuit; and
   a controller that is coupled to the first gating circuit, the second gating circuit, the receiver circuit, and the shared clocking circuit, wherein the controller is configured to supply a first gating signal to the first gating circuit, the receiver circuit, and the shared clocking circuit, and wherein the controller is configured to supply a second gating signal to the second gating circuit and shared clocking circuit, and wherein the controller is configured to control the shared clocking circuit such that the shared clocking circuit provides a first local oscillator signal to the receiver circuit when the first gating signal indicates activation, and wherein the controller is configured to control the shared clocking circuit such that the shared clocking circuit provides a second local oscillator signal to the transmitter circuit when the second gating signal indicates activation.

2. The apparatus of claim 1, wherein the local oscillator further comprises a first local oscillator, and wherein the shared clocking circuit further comprises:
   a shifting circuit that is coupled to the first local oscillator and the controller;
   a third gating circuit that is coupled to the shifting circuit and the controller, wherein the third gating circuit is configured to receive the second gating signal;
   a second local oscillator that is coupled to the shifting circuit and the transmitter circuit;
   a fourth gating circuit that is coupled to the second local oscillator and the controller, wherein the fourth gating circuit is configured to receive the second gating signal;
   a buffer that is coupled to the second local oscillator and the receiver circuit; and
   a fifth gating circuit that is coupled to the buffer and the controller, wherein the fifth gating circuit is configured to receive the first gating signal.

3. The apparatus of claim 2, wherein the receiver circuit further comprises:
   a low noise amplifier (LNA) that is coupled to the radiator;
   a sixth gating circuit that is coupled to the controller and the LNA, wherein the sixth gating circuit is configured to receive the first gating signal;
   a mixer that is coupled to the LNA, the buffer, and the baseband circuit; and
   a seventh gating circuit that is coupled to the controller and the mixer, wherein the seventh gating circuit is configured to receive the first gating signal.

4. The apparatus of claim 3, wherein the mixer has first and second output terminals, and wherein the receiver circuit further comprises:
   a switch that is coupled between the first and second output terminals of the mixer; and
   a switch controller that is coupled to the controller and the switch, wherein the switch controller is configured to receive the first gating signal.

5. The apparatus of claim 4, wherein the shifting circuit further comprises:
   a phase shifter that is coupled to the first local oscillator and the third gating circuit;
   a multiplexer that is coupled to the phase shifter;
   an edge selection circuit that is configured to receive a transmit pulse;
   a flip-flop that is coupled to the edge select circuit and the controller, wherein the flip-flop is configured to receive the second gating signal;
   a transmit select circuit that is coupled to the flip-flop and the multiplexer, wherein the transmit select circuit is configured to control the multiplexer.

6. The apparatus of claim 5, wherein each of the first, second, third, fourth, fifth sixth, and seventh gating circuits further comprise:
   a first logic gate that is coupled to the controller; and
   a second logic gate that is coupled to the first logic gate and the controller.

7. The apparatus of claim 6, wherein the first logic gate is an OR gate and the second logic gate is an AND gate.

8. An apparatus comprising:
   a first gating circuit;
   a second gating circuit;
   a baseband that is coupled to the first gating circuit;
   a local oscillator that is coupled to the second gating circuit;

a plurality of transceiver that are arranged in to a phased array, wherein each transceiver includes:
a radiator;
a receiver circuit that is coupled between the radiator and the baseband circuit;
a transmitter circuit that is coupled to the radiator; and
a shared clocking circuit that is coupled to the local oscillator, the receiver circuit, and the transmitter circuit; and
a controller that is coupled to the first gating circuit, the second gating circuit, the receiver circuit, and the shared clocking circuit, wherein the controller is configured to supply a first gating signal to the first gating circuit, the receiver circuit, and the shared clocking circuit, and wherein the controller is configured to supply a second gating signal to the second gating circuit and shared clocking circuit, and wherein the controller is configured to control the shared clocking circuit such that the shared clocking circuit provides a first local oscillator signal to the receiver circuit when the first gating signal indicates activation, and wherein the controller is configured to control the shared clocking circuit such that the shared clocking circuit provides a second local oscillator signal to the transmitter circuit when the second gating signal indicates activation.

9. The apparatus of claim 8, wherein the local oscillator further comprises a first local oscillator, and wherein the shared clocking circuit further comprises:
a shifting circuit that is coupled to the first local oscillator and the controller;
a third gating circuit that is coupled to the shifting circuit and the controller, wherein the third gating circuit is configured to receive the second gating signal;
a second local oscillator that is coupled to the shifting circuit and the transmitter circuit;
a fourth gating circuit that is coupled to the second local oscillator and the controller, wherein the fourth gating circuit is configured to receive the second gating signal;
a buffer that is coupled to the second local oscillator and the receiver circuit; and
a fifth gating circuit that is coupled to the buffer and the controller, wherein the fifth gating circuit is configured to receive the first gating signal.

10. The apparatus of claim 9, wherein the receiver circuit further comprises:
an LNA that is coupled to the radiator;
a sixth gating circuit that is coupled to the controller and the LNA, wherein the sixth gating circuit is configured to receive the first gating signal;
a mixer that is coupled to the LNA, the buffer, and the baseband circuit; and
a seventh gating circuit that is coupled to the controller and the mixer, wherein the seventh gating circuit is configured to receive the first gating signal.

11. The apparatus of claim 10, wherein the mixer has first and second output terminals, and wherein the receiver circuit further comprises:
a switch that is coupled between the first and second output terminals of the mixer; and a switch controller that is coupled to the controller and the switch, wherein the switch controller is configured to receive the first gating signal.

12. The apparatus of claim 11, wherein the shifting circuit further comprises:
a phase shifter that is coupled to the first local oscillator and the third gating circuit;
a multiplexer that is coupled to the phase shifter;
an edge selection circuit that is configured to receive a transmit pulse;
a flip-flop that is coupled to the edge select circuit and the controller, wherein the flip-flop is configured to receive the second gating signal;
a transmit select circuit that is coupled to the flip-flop and the multiplexer, wherein the transmit select circuit is configured to control the multiplexer.

13. The apparatus of claim 12, wherein the transmitter circuit further comprises a power amplifier (PA).

14. The apparatus of claim 13, wherein the multiplexer further comprises a first multiplexer, and wherein the switch controller further comprises:
a delay circuit that is coupled to the controller and that is configured to receive the first gating signal;
a second multiplexer that is coupled to the delay circuit and the flip-flop;
a third multiplexer that is coupled to the second multiplexer; and
an inverter that is coupled to the third multiplexer.

15. The apparatus of claim 14, wherein each of the first, second, third, fourth, fifth sixth, and seventh gating circuits further comprise:
a first logic gate that is coupled to the controller; and
a second logic gate that is coupled to the first logic gate and the controller.

16. The apparatus of claim 15, wherein the first logic gate is an OR gate and the second logic gate is an AND gate.

17. A method comprising:
generating a first edge on a first gating signal;
activating a local oscillator and a shared clocking circuit with the first edge on the first gating signal;
generating a second edge on a second gating signal following the first edge on the first gating signal;
activating a receiver circuit with the second edge on the second gating signal, wherein the receiver circuit includes a mixer;
generating a transmit pulse following the first edge on the first gating signal, wherein the transmit pulse has a third edge;
releasing a switch that short circuits outputs of the mixer following the later of the third edge of the transmit pulse and a delay.

18. The method of claim 17, wherein the first and second edges are rising edges and the third edge is a falling edge.

19. The method of claim 18, wherein the step of generating the transmit pulse occurs prior to the step of generating the second edge.

* * * * *